United States Patent Office 2,905,656
Patented Sept. 22, 1959

2,905,656

ISOPROPYL BENZENE-ACROLEIN STYRENE TERPOLYMER

Earl C. Chapin and Raymond I. Longley, Jr., Springfield, Mass., assignors to Monsanto Chemical Company, St. Louis, Mo., a corporation of Delaware No Drawing. Application June 24, 1957
Serial No. 667,712
11 Claims. (Cl. 260—73)

This invention relates to organic solvent-soluble copolymers useful in the preparation of surface coating compositions. More particularly, the invention relates to organic solvent-soluble copolymers of acrolein and vinyl aromatic compounds.

Useful copolymers of acrolein and vinyl aromatic compounds have been disclosed in the prior art. However, the copolymers which are insoluble cannot be used in coating and other applications requiring solubility of the polymer, and the satisfactory copolymers which are soluble are prepared by processes which are not as economical as might be desired.

One object of this invention is to provide organic solvent-soluble copolymers useful in the preparation of surface coating compositions.

Another object is to provide organic solvent-soluble copolymers of acrolein and vinyl aromatic compounds.

A further object is to provide economical processes for making such copolymers.

These and other objects are attained by polymerizing a mixture of acrolein and a vinyl aromatic compound at 180°–250° C. under autogenous or higher pressure in the presence of a member of a restricted class of alkylbenzenes.

The following examples are given to illustrate the invention. Parts mentioned are parts by weight.

*Example I*

A pressure-resistant reaction vessel is charged with a mixture of 220 parts of isopropylbenzene, 100 parts of freshly distilled acrolein, and 190 parts of styrene. The reaction vessel is then flushed with nitrogen, sealed, and heated in an oil bath at 200° C. for one hour. The product is stripped of volatile materials to 180° C. under a vacuum of 1 mm. of mercury. The process results in about 60% conversion to a copolymer containing substantially equal mol percentages of styrene and acrolein and having about 5 mol percent isopropylbenzene chemically combined therein. This copolymer is soluble in organic solvents such as butanol, methyl ethyl ketone, toluene, tetrahydrofuran, etc.

*Example II*

The process of Example I is repeated with the exception that 4 parts of di-tertiary-butyl peroxide are included in the reaction mixture charge. The process results in over 5% conversion to a copolymer which is substantially the same as the copolymer of Example I.

*Example III*

A pressure-resistant reaction vessel is charged with a mixture of 290 parts of isopropylbenzene, 100 parts of acrolein, 190 parts of styrene, and 10 parts of di-tertiary-butyl peroxide. The reaction vessel is then flushed with nitrogen, sealed, and heated in an oil bath at 220° C. for one hour. The product is stripped of volatile materials to 200° C. under a vacuum of 1 mm. of mercury. The process results in over 85% conversion to a copolymer containing substantially equal mol percentages of styrene and acrolein and having about 6 mol percent isopropylbenzene chemically combined therein. This copolymer is soluble in organic solvents such as butanol, methyl ethyl ketone, toluene, tetrahydrofuran, etc.

*Example IV*

A mixture of 100 parts of freshly distilled acrolein, 185 parts of styrene, 250 parts of isopropylbenzene, 35 parts of acetone, and 5 parts of di-tertiary-butyl peroxide is continuously fed under a pressure of 350 p.s.i. to a tubular reaction vessel maintained at 220° C. over a period of about 400 minutes. From about 80 minutes after the beginning of this feed, the product is continuously withdrawn from the reaction vessel. The product is stripped of volatile materials to 220° C. under a vacuum of about 1 mm. of mercury. The process results in about 75% conversion to a copolymer containing substantially equal mol percentages of styrene and acrolein and containing about 6 mol percent isopropylbenzene chemically combined therein. This copolymer is soluble in organic solvents such as butanol, methyl ethyl ketone, toluene, tetrahydrofuran, etc.

The products of this invention are organic solvent-soluble copolymers of acrolein and vinyl aromatic compounds modified by a chemically-combined alkylbenzene. The vinyl aromatic compounds which may be copolymerized with acrolein are styrene, ar-substituted styrenes such as o-, m-, and p-alkyl styrenes and o-, m-, and p-alkoxy styrenes, and mixtures thereof. Preferably, the ar-substituents contain not more than 4 carbon atoms in a group. The vinyl aromatic compounds are copolymerized with acrolein in a ratio of about 40–90 mols of vinyl aromatic compound to about 60–10 mols of acrolein. The preferred copolymers contain the vinyl aromatic compounds and acrolein in substantially equal molar amounts.

The alkylbenzenes which may be included in the reaction mixture for modification of the copolymer are isopropylbenzene, ar-substituted isopropylbenzenes such as p-methyl isopropylbenzene and o-, m-, and p-diisopropylbenzenes, and mixtures thereof. Preferably, the ar-substituents contain not more than 4 carbon atoms in a group. The amount of alkylbenzene included in the reaction mixture varies with the acrolein content and particularly with the reaction temperature. Thus the amount necessarily included increases with a decrease in the reaction temperature. In making the preferred copolymers of this invention the alkylbenzene constitutes about 50% by weight of the reaction mixture. The final copolymers contain about 1–15 mol percent chemically-combined alkylbenzene.

The copolymers are prepared by polymerizing a mixture of acrolein, vinyl aromatic compound, and alkylbenzenes under autogenous or higher pressure at 180°–250° C. in the presence or absence of a co-solvent and/or a polymerization initiator. The polymerization process may be conducted continuously or batch-wise. According to a preferred embodiment of this invention, the reaction mixture is polymerized under autogenous pressure in a closed reaction vessel which, before sealing and heating, is preferably purged of air with an inert gas such as nitrogen. When the polymerization is conducted continuously, pressures greater than autogenous pressure are employed, as illustrated in Example IV. After completion of the reaction, volatile materials are removed by conventional procedures, e.g., by vacuum distillation at elevated temperatures.

Suitable co-solvents for use in the reaction mixture include conventional ether, alcohol, ketone, and other organic solvents, particularly isopropanol, acetone, methyl ethyl ketone, tetrahydrofuran, and the like. The cosolvent, when used, may replace up to about 50% by weight of the alkylbenzene, i.e., it may constitute up to about 25% by weight of the reaction mixture when making the preferred copolymers of this invention. The cosolvent may be partially combined in the product through chain transfer reactions.

Although the polymerization process may be conducted in the absence of an initiator, higher conversions are obtained when a polymerization initiator is used. Suitable initiators include the free radical-generating initiators such as ultra-violet radiation, gamma rays, peroxy compounds, e.g., hydrogen peroxide, di-tertiary-butyl peroxide, cumene hydroperoxide, etc. When a chemical, e.g., a peroxy compound, is used as a polymerization initiator in the reaction mixture, it may constitute up to about 5% by weight, based on the total weight of the monomers.

The products of this invention are hard, brittle resins having number average molecular weights of 700–10,000, preferably 700–3000, and a combined acrolein content of 10–60 mol percent, preferably about 50 mol percent. Branching of the polymer chain during polymerization leads to the formation of ketone groups which are present in the final product. More ketone groups are present in the copolymers formed at higher temperatures than in those formed at lower temperatures. The copolymers contain about 1–15 mol percent chemically-combined alkylbenzene and are soluble in organic solvents such as hydrocarbons, e.g., toluene, xylene, etc., alcohols, ketones, ethers, tetrahydrofuran, etc.

The copolymers of this invention are particularly useful as film-forming materials and as chemical intermediates. They may be used in compositions for treating textiles, paper, fibers, films, etc., or may be combined with other film-forming materials for use in surface coating compositions. Also, they may be hydrogenated to form polymers containing reactive hydroxyl groups.

It is obvious that many variations may be made in the products and processes set forth above without departing from the spirit and scope of this invention.

What is claimed is:

1. A process for making a copolymer of 10–60 mol percent of acrolein and 90–40 mol percent of a vinyl aromatic compound, said copolymer having a number average molecular weight of 700–10,000, which comprises polymerizing a mixture of the monomers at 180°–250° C. under at least autogenous pressure in the presence of an amount of an alkylbenzene sufficient at the reaction conditions to form an acrolein-vinyl aromatic compound-alkylbenzene product containing 1–15 mol percent of chemically-combined alkylbenzene, said alkylbenzene being a member of the group consisting of isopropylbenzene and ar-substituted derivatives thereof wherein the ar-substituent is an alkyl radical containing 1–4 carbon atoms, said vinyl aromatic compound being a member of the group consisting of styrene and ar-substituted derivatives thereof wherein the ar-substituent is a member of the group consisting of alkyl and alkoxy radicals containing 1–4 carbon atoms.

2. A process as in claim 1 wherein the alkylbenzene comprises 50% by weight of the reaction mixture.

3. A process as in claim 1 wherein the vinyl aromatic compound is styrene and the alkylbenzene is isopropylbenzene.

4. The product prepared by the process of claim 1.

5. The product prepared by the process of claim 2.

6. The product prepared by the process of claim 3.

7. A product as in claim 6 wherein the copolymer has a combined acrolein content of substantially 50 mol percent.

8. The product prepared by the process of claim 11.

9. A process as in claim 1 wherein the mixture is polymerized in a closed reaction vessel under autogenous pressure.

10. A process as in claim 1 wherein the mixture is fed continuously to a reaction vessel and polymerized under pressure greater than autogenous pressure.

11. A process as in claim 1 wherein the polymerization is conducted in the presence of an organic solvent of the group consisting of alcohols, ketones and ethers.

References Cited in the file of this patent
UNITED STATES PATENTS

| | | |
|---|---|---|
| 2,448,976 | Heligman | Sept. 7, 1948 |
| 2,514,168 | Smith et al. | July 4, 1950 |
| 2,657,192 | Miller et al. | Oct. 27, 1953 |

UNITED STATES PATENT OFFICE
CERTIFICATE OF CORRECTION

Patent No. 2,905,656                                                                 September 22, 1959

Earl C. Chapin et al.

It is hereby certified that error appears in the printed specification of the above numbered patent requiring correction and that the said Letters Patent should read as corrected below.

Column 1, line 61, for "over 5%" read -- over 75% --.

Signed and sealed this 19th day of April 1960.

(SEAL)
Attest:

KARL H. AXLINE                                                     ROBERT C. WATSON

Attesting Officer                                              Commissioner of Patents